(12) United States Patent
Kitamura et al.

(10) Patent No.: US 6,835,069 B2
(45) Date of Patent: Dec. 28, 2004

(54) APPARATUS FOR WIRING BICYCLE ELECTRICAL COMPONENTS

(75) Inventors: Satoshi Kitamura, Kitakatsuragi-gun (JP); Tadashi Ichida, Ikoma (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/604,932

(22) Filed: Aug. 27, 2003

(65) Prior Publication Data

US 2004/0115962 A1 Jun. 17, 2004

(30) Foreign Application Priority Data

Aug. 30, 2002 (JP) ....................... 2002-254782

(51) Int. Cl.[7] .......................... H01R 33/00; H02K 13/00
(52) U.S. Cl. ...................................................... 439/34
(58) Field of Search ............................................ 439/34

(56) References Cited

U.S. PATENT DOCUMENTS

| | | | |
|---|---|---|---|
| 4,823,036 A | * | 4/1989 | Roberts ....................... 310/237 |
| 5,483,137 A | | 1/1996 | Fey et al. |
| 6,012,353 A | * | 1/2000 | Kawakami .................. 74/502.2 |
| 6,148,262 A | * | 11/2000 | Fry ............................. 701/213 |
| 2002/0064995 A1 | * | 5/2002 | Nishimoto ................... 439/606 |

* cited by examiner

Primary Examiner—Renee Luebke
(74) Attorney, Agent, or Firm—James A. Deland (57) ABSTRACT

A bicycle electrical control apparatus comprises a first control unit that provides first electrical signals; a second control unit that provides second electrical signals; and an electrical connecting cord having a first end coupled to the first control unit and a second end coupled to the second control unit for communicating the first electrical signals from the first control unit to the second control unit. A first connecting terminal is fastened to one of the first and second ends of the electrical connecting cord, a second connecting terminal is disposed on one of the first and second control units, and the first connecting terminal is detachably connected to the second connecting terminal.

26 Claims, 6 Drawing Sheets

APPARATUS FOR WIRING BICYCLE ELECTRICAL COMPONENTS

BACKGROUND OF INVENTION

The present invention is directed to bicycles and, more particularly, to an apparatus for wiring bicycle electrical components.

In recent years, bicycles have been equipped with a variety of electrical components. Such electrical components include gear shift devices, suspension devices, display devices, and the control devices used to control them. For example, an automatic gear shifting device may use the signal from a speed sensor to automatically change gears in a gear shifting device based on bicycle speed. In this case, power supply lines and/or control signal lines usually are connected between the control device, the gear shift device and the speed sensor.

One approach to reducing the number of wires connected between the components is to construct the control device integrally with the controlled device. For example, a gear shift control device may be constructed integrally with a gear shift unit, or a display control device may be constructed integrally with a display unit. Such an approach works satisfactorily when the number of electrical devices is relatively small. However, when the number of electrical devices to be controlled increases, the number of power and/or control lines increases dramatically. One approach to reducing the number of wires in this situation involves the use of distributed intelligent control units and integrated or composite signals to provide power and/or control signals to the components. Such signals sometimes take the form of pulsed signals, wherein the signal is repetitively turned on and off to provide both power and control information to the components. The resulting system uses fewer wires, and the length of wiring between the components decreases.

However, even in such systems, the distance between electrical components and the routing of the wires varies depending upon the bicycle model and the frame construction. As a result, the length of the wiring cannot be predetermined, so the placement of the components is limited according to the arbitrary wire lengths provided by the manufacturer.

SUMMARY OF INVENTION

The present invention is directed to various features of an apparatus for wiring bicycle electrical components. In one embodiment, a bicycle electrical control apparatus comprises a first control unit that provides first electrical signals; a second control unit that provides second electrical signals; and an electrical connecting cord having a first end coupled to the first control unit and a second end coupled to the second control unit for communicating the first electrical signals from the first control unit to the second control unit. A first connecting terminal is fastened to one of the first and second ends of the electrical connecting cord, a second connecting terminal is disposed on one of the first and second control units, and the first connecting terminal is detachably connected to the second connecting terminal. Additional inventive features will become apparent from the description below, and such features alone or in combination with the above features may form the basis of further inventions as recited in the claims and their equivalents.

DETAILED DESCRIPTION

Figure 1:
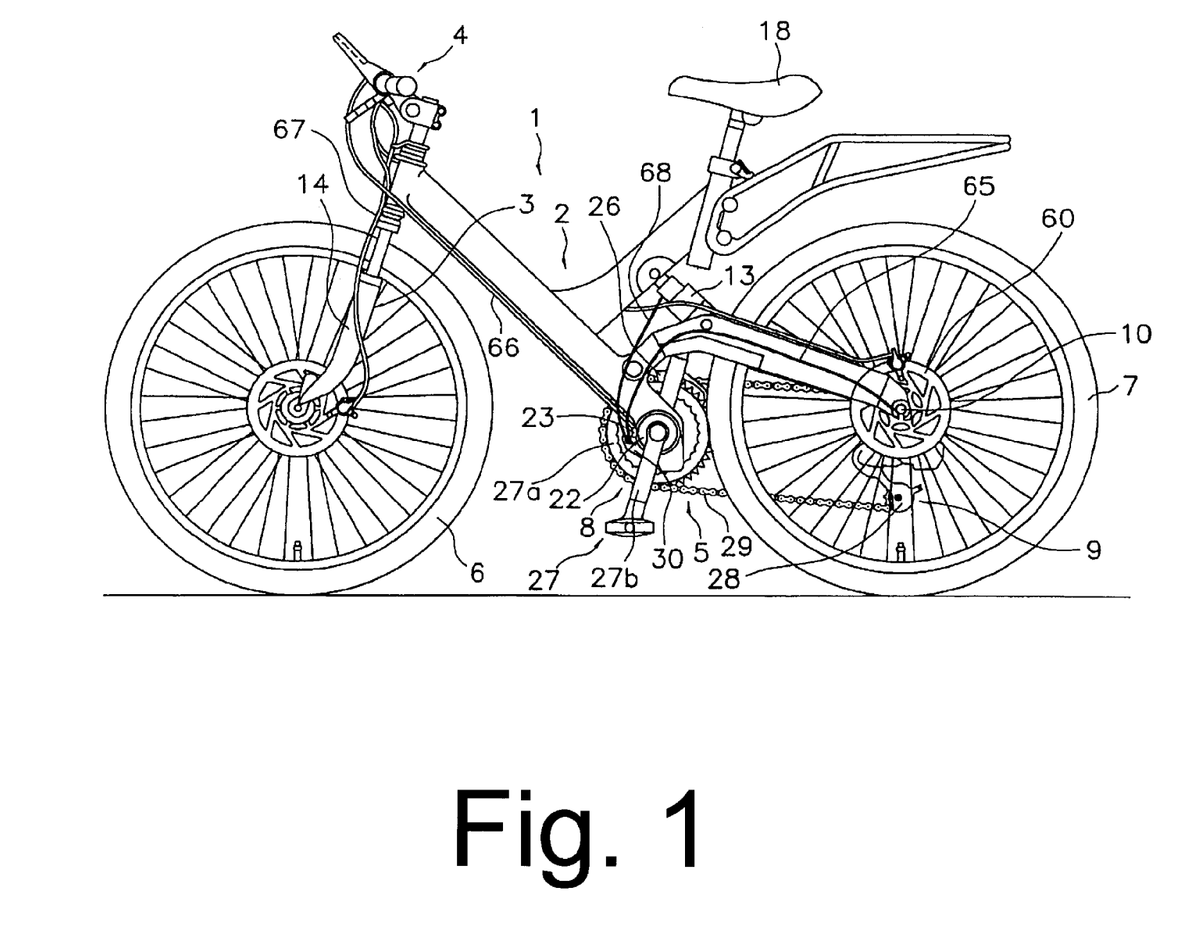
FIG. 1 is a side view of a bicycle including an apparatus for wiring electrical components.

FIG. 1 is a side view of a bicycle including an apparatus for wiring electrical components. In this embodiment, the bicycle is a mountain bicycle comprising a frame 1 having a tubular frame body 2; a front fork 3 mounted to the front of frame body 2 for rotation around an inclined axis; a front wheel 6 rotatably mounted to front fork 3; a handlebar assembly 4 mounted to the upper portion of front fork 3; a rear wheel 7 rotatably mounted to a hub dynamo 10 at the rear portion of frame body 2, a driving portion 5 comprising front and rear gear-shift mechanisms 8 and 9; and a controller 11 (FIG. 3) for controlling various electrical components including front and rear gear-shift mechanisms 8 and 9. A front suspension 14 is mounted to front fork 3, a rear suspension 13 is mounted to the rear of frame body 2, and a saddle 18 is mounted to the middle of frame body 2.

Figure 2:
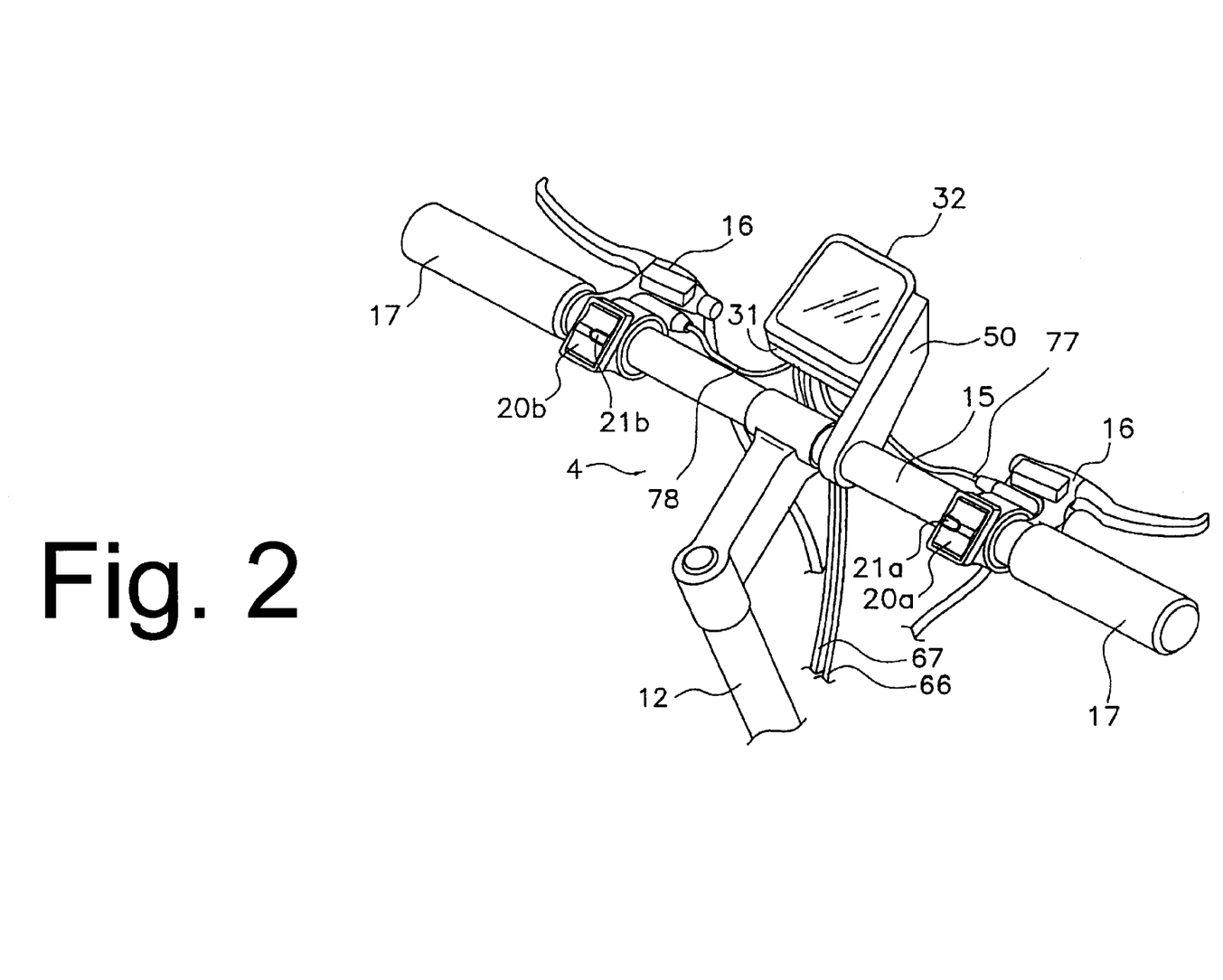
FIG. 2 is an enlarged oblique view of the bicycle handlebar assembly.

As shown in FIG. 2, handlebar assembly 4 comprises a handle stem 12 and a handlebar 15, wherein handle stem 12 is fastened to the upper portion of the front fork 3, and handlebar 15 is fastened to handle stem 12. Brake levers 16 and grips 17 are mounted at opposite ends of the handlebar 15. Gear-shift switches 20a and 20b are provided for carrying out manual gear-shift operations of the front and rear gear-shift mechanisms 8 and 9. An operating switch 21a is provided for switching between an automatic mode and a manual mode of operation, and an operating switch 21b is provided for manually adjusting the stiffness of the front and rear suspensions 13 and 14.

Front gear-shift mechanism 8 comprises a crank arm assembly 27 including right side crank arm 27a and a left side crank arm 27b mounted to a crankshaft (not shown) that is rotatably mounted within a bottom bracket portion of frame body 2. A plurality of front sprockets (e.g., three sprockets) are mounted to crank arm 27a, and a front derailleur 26 is mounted to frame body 2 in close proximity to crank arm 27a for switching a chain 29 among the plurality of front sprockets. Rear gear-shift mechanism 9 comprises a plurality of rear sprockets (e.g., nine sprockets), and a rear derailleur 28 is mounted to the rear of frame body 2 for switching chain 29 among the plurality of rear sprockets 27.

The hub dynamo 10 mounted to rear wheel 7 is adapted to mount a brake disc 60 and a freewheel to which the plurality of rear sprockets is mounted. An alternating current generator 19 (FIG. 3) is mounted inside the hub for generating power according to the rotation of the rear wheel 7.

A rotation detector 22 operates in conjunction with the left crank arm 27b for detecting the rotation of the crank arm assembly 27. Rotation detector 22 comprises a reed switch 23 (FIG. 3) mounted to frame body 2 and a plurality of (e.g., four) magnets mounted to left crank arm 27b and circumferentially spaced evenly with respect to the rotational axis of crank arm assembly 27. Thus, reed switch 23 of rotation detector 22 outputs four pulses for each revolution of crank arm assembly 27. In this embodiment, the rotation detector 22 is used to control the operation of the front and rear externally mounted gear-shift mechanisms 8 and 9, since it is preferable that the gear-shift mechanisms be operated only when the crank arm assembly 27 is rotating. The signals from rotation detector 22 also may be used to calculate and display cadence.

Controller 11 manually controls the front and rear gear-shift mechanisms 8 and 9 and front and rear suspensions 13 and 14 in response to the operation of the gear-shift switches 20a and 20b and operating switches 21a and 21b. Controller 11 also may automatically control the front and rear gear-shift mechanisms 8 and 9 and front and rear suspensions 13 and 14 in response to the speed of the bicycle.

Figure 3:
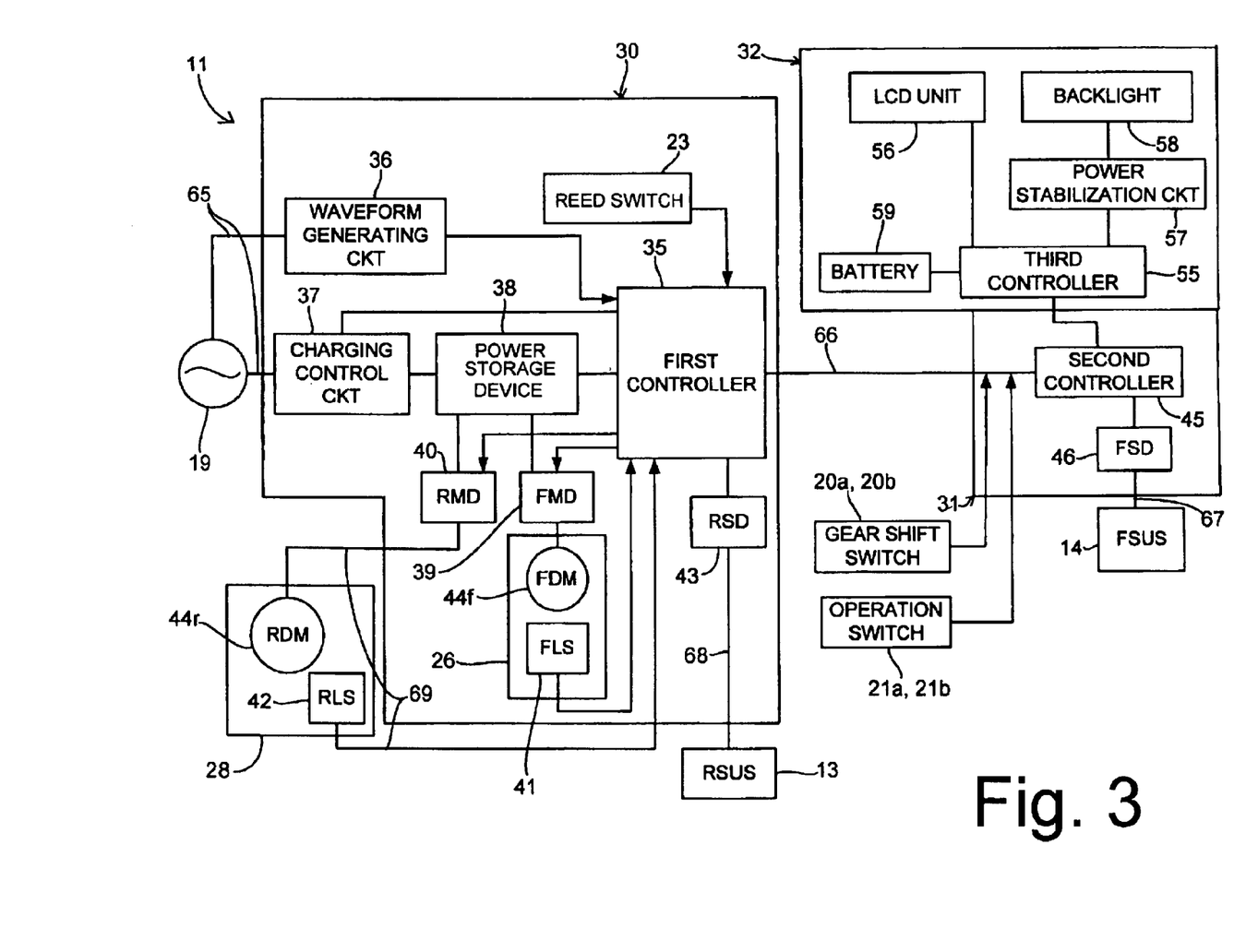
FIG. 3 is a block diagram of a particular embodiment of a control circuit that controls a plurality of bicycle components.

As shown in FIG. 3, controller 11 has a first control unit 30, a second control unit 31, and a third control unit 32. First control unit 30 may be integrally assembled with front derailleur 26 at the bottom bracket portion of frame body 2 in close proximity to the left crank arm 27b. First control unit 30 is connected to and is powered by alternating current generator 19 through an electrical connecting cord 65. First control unit 30 powers and controls the front derailleur 26 through internal wiring, it powers and controls the rear derailleur 28 through an electrical connecting cord 69, and it powers and controls rear suspension 13 through an electrical connecting cord 68. Since first control unit 30 is provided close to the alternating current generator 19, a shorter connecting cord 65 may be used, thus increasing the efficiency of signal communication.

The first control unit 30 includes a first control portion 35 in the form of a microcomputer, reed switch 23, a waveform-shaping circuit 36 for generating a speed signal derived from the output of the alternating current generator 19, a charging control circuit 37, a power storage device 38, a front derailleur motor driver (FMD) 39, a rear derailleur motor driver (RMD) 40, a front derailleur 26 operating position sensor (FLS) 41, a rear derailleur 28 operating position sensor (RLS) 42, and a rear suspension motor driver (RSD) 43. The charging control circuit 37 rectifies the power output from the alternating current generator 19 and produces direct current power. The power storage device 38 may comprise a large-capacity capacitor, for example, for storing the direct current power produced by charging control circuit 37. If desired, the power storage device 38 may comprise a secondary storage battery such as a nickel cadmium battery, lithium ion battery, nickel hydride battery, etc. instead of a capacitor. The power stored in the power storage device 38 is communicated to the first control portion 35 and to the motor drivers 39, 40 and 43. The motor drivers 39, 40 and 43 output driving signals for driving motors 44f and 44r used to control derailleurs 26 and 28 and a motor (not shown in the figure) used to control the rear suspension 13 in accordance with control signals from first control portion 35.

The first control unit 30 controls the gear shift devices 8 and 9 and the rear suspension 13 in accordance with the riding mode. More specifically, in automatic mode, the first control unit 30 performs gear shift control of the gear shift devices 8 and 9 in response to the bicycle speed and adjusts the stiffness of the rear suspension 13 in response to the bicycle speed. In manual mode, the gear shift devices 8 and 9 and the rear suspension 13 are controlled in response to the operation of the gear shift switches 20a and 20b and the operation switches 21a and 21b.

Figure 4:
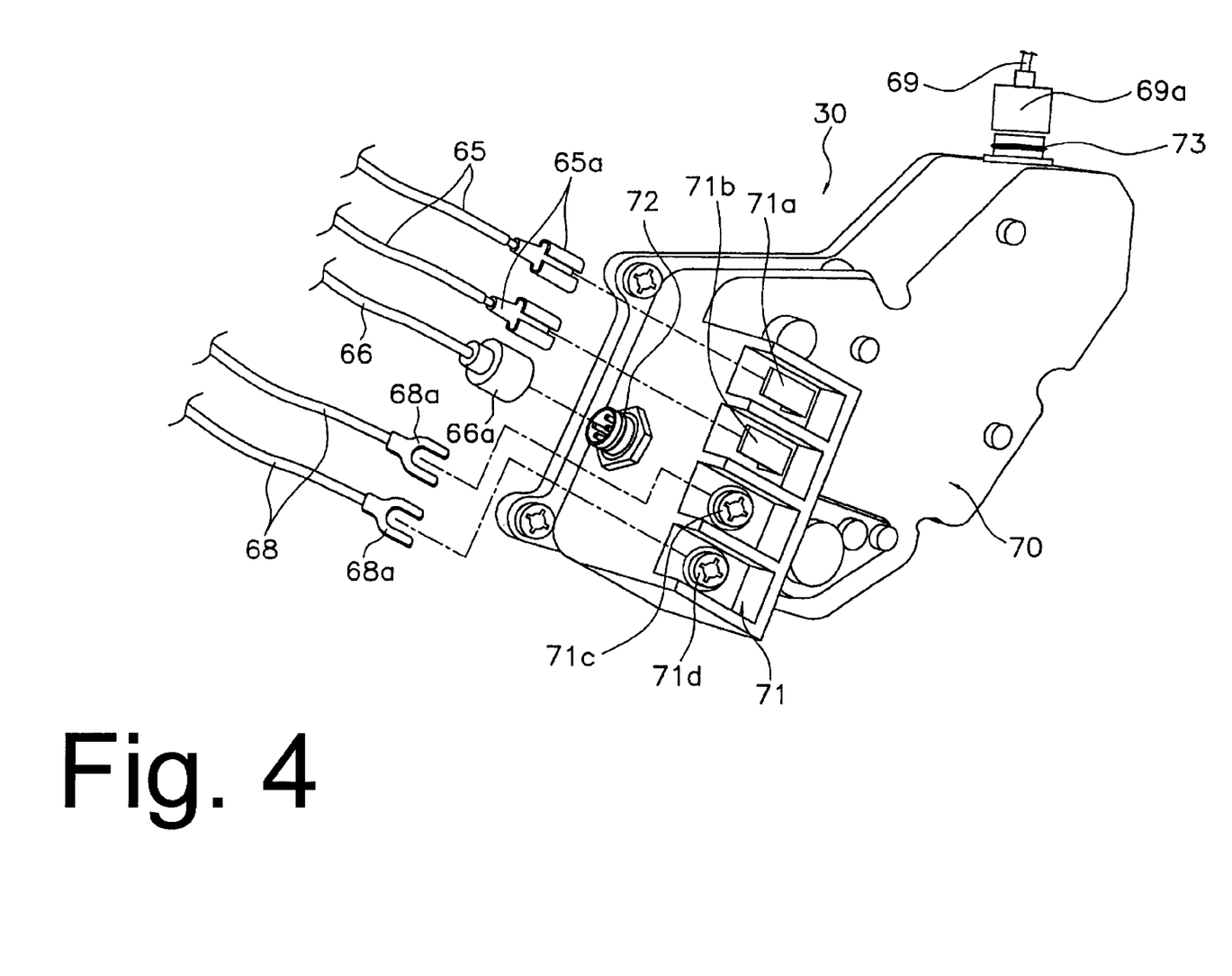
FIG. 4 is an external perspective view of a first control unit.

The first control unit 30 has a case 70 (FIG. 4) that houses the various electrical components discussed above. As shown in FIG. 4, case 70 includes a terminal board 71 used for mounting the connecting cords 65 and 68 and two chassis plugs 72 and 73 used for mounting the connecting cords 66 and 69. A chassis socket 66a having a plurality of (e.g., four) female terminals mounted to one end of the connecting cord 66 is connected to a chassis plug 72 having a corresponding plurality of male terminals or pins, and the other end of the connecting cord 66 is connected to the second control unit 31. A chassis socket 69a mounted to one end of the connecting cord 69 is connected to a chassis plug 73, and the other end of the connecting cord 69 is connected to the rear derailleur 28.

A pair of plate-shaped male FASTON terminals 71a and 71b and a pair of screw terminals 71c and 71d are disposed on the terminal board 71. A pair of female FASTON terminals 65a that are crimped onto one end of the connecting cord 65 are connected to the male FASTON terminals 71a and 71b, and the alternator 19 is connected to the other end of the connecting cord 65. A pair of Y-terminals 68a and 68b that are crimped to one end of the connecting cord 68 are connected to the screw terminals 71c and 71d, respectively, and the rear suspension 13 is connected to the other end of the connecting cord 68. Because the terminal configurations of the connecting cord 65 connected to the alternator 19 and the connecting cord 68 connected to the rear suspension 13 are different, the connecting cords 65 and 68 cannot be mistakenly connected in place of each other. As a result, damage to the various circuits inside the first control unit 30, which could easily take place if a mistaken connection were to occur, can be prevented.

The first control unit 30 also supplies power and control signals to the second control unit 31 and third control unit 32 through an electrical connection cord 66. More specifically, the first control unit 30 provides composite power/control signals that are pulsed ON and OFF. The control signals may include the speed signals from waveform-shaping circuit 36. The second control unit 31 and third control unit 32 derive power from the power signal components of the composite signals and are controlled according to control signal components of the composite signals.

The second control unit 31 is mounted via a bracket 50 (FIGS. 2, 5 and 6) to the handlebar 15 of the handlebar assembly 4. The second control unit 31 comprises gear-shift switches 20a and 20b, operating switches 21a and 21b, a second control portion 45 in the form of a microcomputer, and a front suspension motor driver (FSD) 46. The second control unit 31 transfers the operating data of switches 20a, 20b, 21a and 21b to the first control unit 30. In automatic mode, second control portion 45 adjusts the stiffness of the front suspension 14 through an electrical connecting cord 67 in accordance with a control signal sent from the first control unit 30 based on bicycle speed. In manual mode, second control portion 45 adjusts the stiffness of the front suspension 14 in accordance with the operation of the operating switch 21b.

Figure 5:
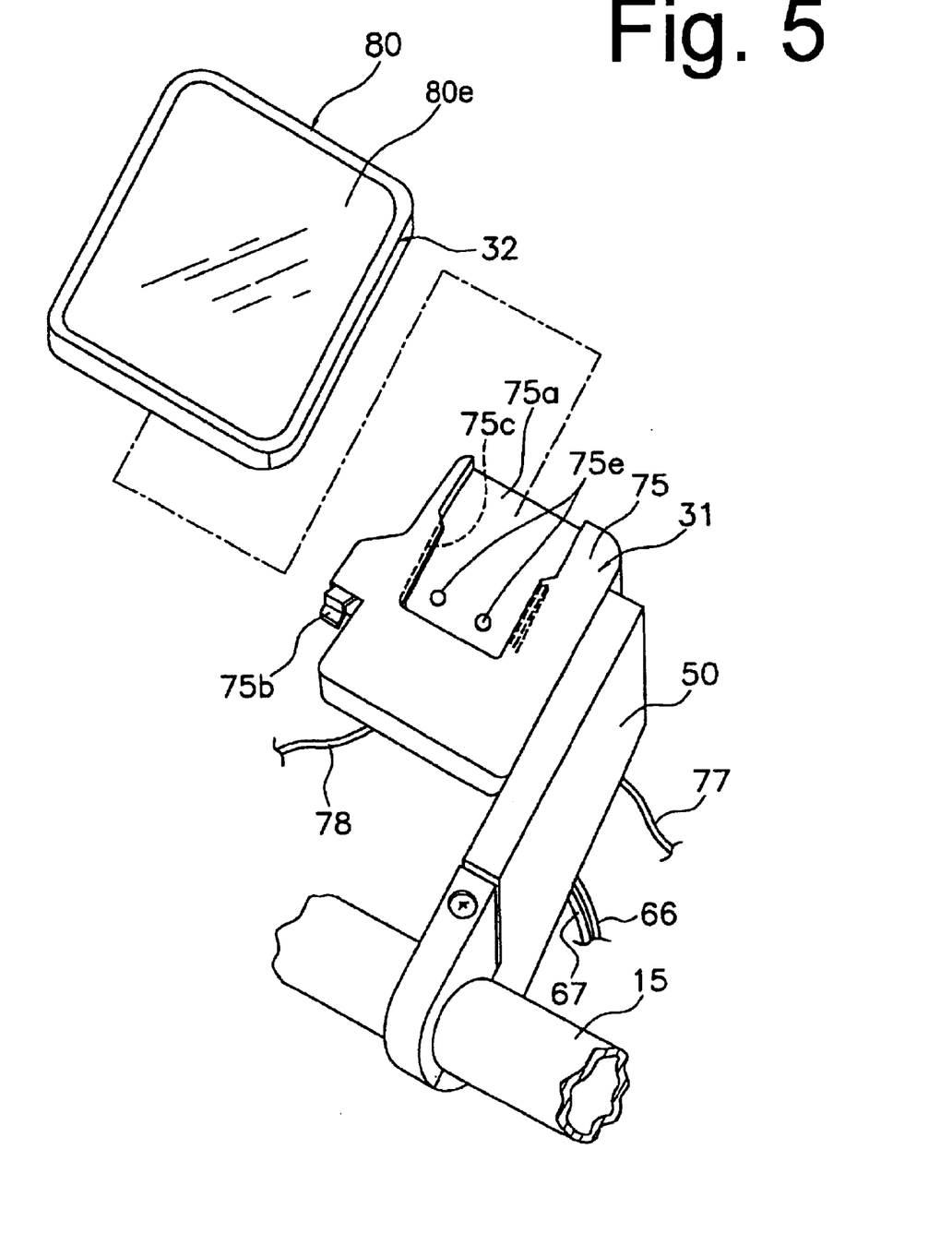
FIG. 5 is a perspective view showing front surfaces of second and third control units.
Figure 6:
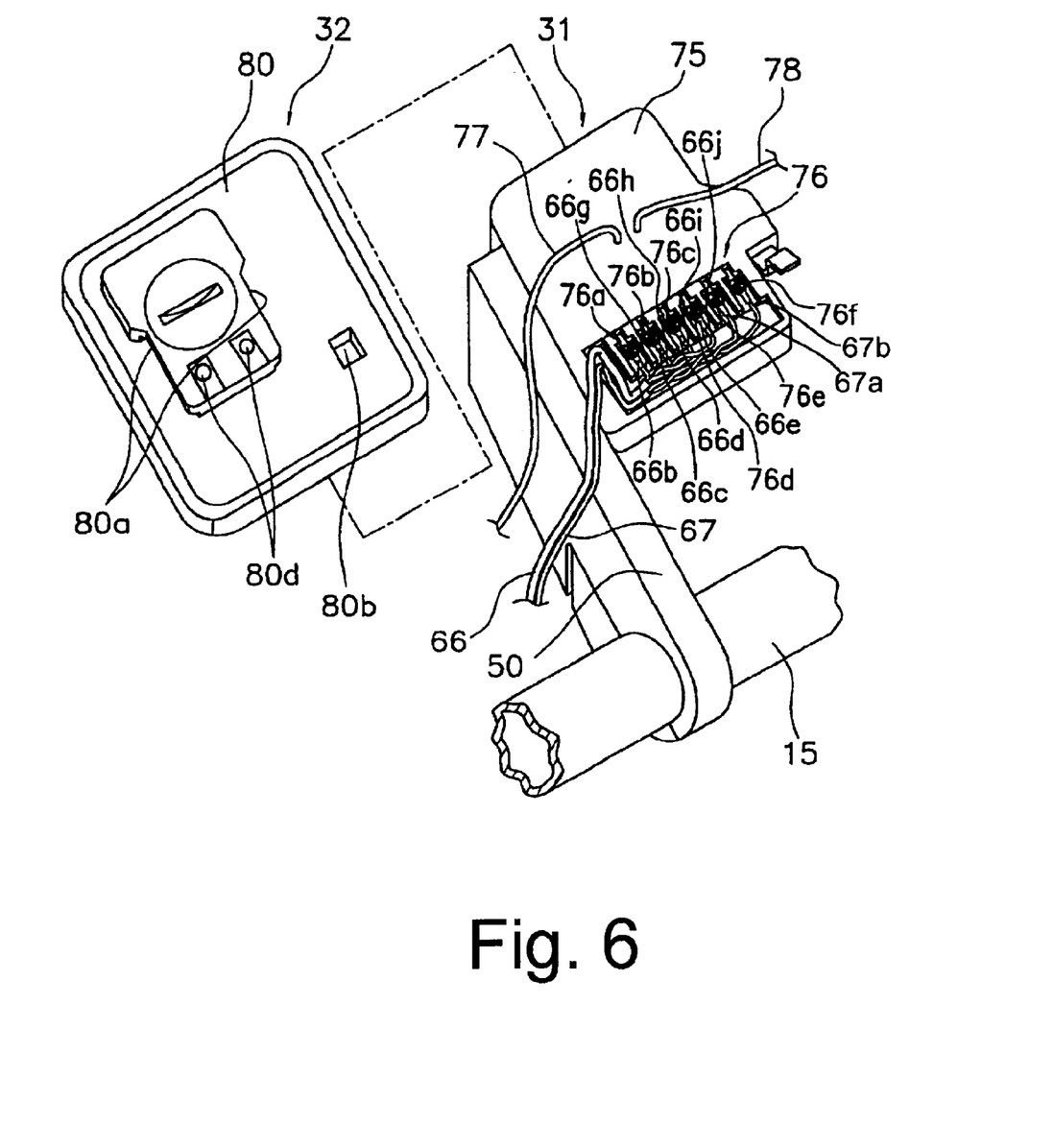
FIG. 6 is a perspective view showing back surfaces of the second and third control units.

As shown in FIGS. 5 and 6, the second control unit 31 has a case 75 that houses the various electrical components described above. A terminal board 76 used for mounting the connecting cords 66 and 67 is disposed on the back surface of the case 75, and six screw terminals 76a–76f are disposed on the terminal board 76.

The connecting cord 66 is a four-wire cord comprising four core wires 66g–66j. Of these core wires, the core wire 66g may be a ground wire for the other three wires. The core wire 66h may be used to supply electric power and control signals (e.g., bicycle speed signals) to the second control unit 31. The core wire 66i may provide signals from the gear shift switches 20a and 20b and the operation switches 21a and 21b, for example, to the first control unit 30. In this embodiment, the current flowing through core wire 66i is an analog current having a different voltage for each switch by using a voltage divider. The core wire 66j may be used to supply electric power that drives the front suspension 14.

As noted above, a chassis socket 66a is mounted to one end of the connecting cord 66. Four Y-terminals 66b–66e that are connected to screw terminals 76a–76d are crimped onto the four core wires 66g–66j at other end of the connecting cord 66. These Y-terminals 66b–66e are respectively crimped onto the four core wires 66g–66j after the connecting cord 66 has been sized and cut in accordance with the bicycle model configuration and/or the size of the frame body 2.

Two Y-terminals 67a and 67b that are connected to screw terminals 76e and 76f are crimped onto one end of the connecting cord 67, and the other end of the connecting cord 67 is connected to the front suspension 14. Connecting cords 77 and 78 extend from the case 75, wherein connecting cord 77 is connected to the gear shift switch 20a and to the operation switch 21a, and connecting cord 78 is connected to the gear shift switch 20b and the operation switch 21b. These cords 77 and 78 terminate at the screw terminals 76c and 76d.

As shown in FIGS. 5 and 6, a guiding cavity 75a having a pair of notches 75c is formed on the front surface of the case 75. A locking piece 75b also is formed on the front surface of case 75. Protrusions 80a disposed on the back of a case 80 that houses the electrical components of the third control unit 32 slidingly and detachably engage the notches 75c, and a concavity 80b disposed on the back of case 80 of third control unit 32 engages with the locking piece 75b. Locking piece 75b possesses a degree of pliability that enables it to detachably engage concavity 80b. Finally, a pair of contact points 75e formed on the front surface of case 75 electrically contact a corresponding pair of contact points 80d formed on the back of case 80 of third control unit 32.

The third control unit 32 is a so-called cycle computer, and it is detachably mounted to the second control unit 31 as noted above. A battery 59 (e.g., a button battery) is mounted to the third control unit 32 so that the third control unit 32 can operate even if it is detached from the second control unit 32. Consequently, various initial settings such as the wheel diameter setting may be performed, and various data such as the distance ridden and the time ridden can be stored therein. The third control unit 32 has a third control portion 55 in the form of a microcomputer, a liquid crystal display (LCD) unit 56, and a backlight 58. Backlight 58 is coupled to third control portion 55 through a power stabilizing circuit 57. These electrical components are housed within case 80. The LCD unit 56 is capable of displaying various data such as speed, cadence, travel distance, gear-shift location, suspension status and so forth through a display window 80a 80e disposed on the front of case 80 in response to control signals received from first control unit 30, and it is illuminated by the backlight 58. The power stabilization circuit 57 stabilizes the power by smoothing the power derived from the composite power/control signals. Consequently, even where intermittent control signals are sent together with the power signals, there is little flickering in the backlight 58. The third control unit 32 also may function as a pedometer, GPS unit, compass or clock if it is detached from the second control unit 31. Providing a dedicated third control unit allows the display to respond quickly to changing conditions, and the first and second control units need not be used to control the display.

In operation, the alternating current generator 19 of the dynamo hub 10 generates electric power when the bicycle is traveling, and the electric power is communicated to the first control unit 30 through the electrical connection cord 65 and stored in the power storage device 38. Since the generator 19 is provided on the rear wheel 7, the power storage device 38 also may be charged by putting the bicycle on its stand and rotating the pedals if the charge produced by normal travel is insufficient. This is particularly helpful when adjusting the gear-shift mechanisms and setting the operations of the LCD unit 56. Also, deriving speed signals from the alternating current generator 19 eliminates the need for a separate speed sensor.

When the bicycle speed either exceeds a predetermined threshold value or falls below a predetermined threshold value in automatic mode, a gear-shift operation is carried out. In this embodiment, the gear-shift operation is carried out with priority given to the rear derailleur 28. When the speed exceeds a predetermined threshold value, the stiffness of both suspensions 13 and 14 also may be made stiffer. In the meantime, various operating parameters are displayed on LCD unit 56 with the help of backlight 58.

Because power signals and control signals are provided in the form of a composite signal, a single line may be used to communicate both signals. Also, since the control apparatus is divided into three separate units, the number and length of lines can be reduced, thus efficiently communicating power and control signals. Furthermore, because the Y-terminals and FASTON terminals can be crimped on the ends of the connecting cords after the lengths of the connecting cords is determined, the control units 30 and 31 can be placed freely on the bicycle. The FASTON terminals and plug/socket arrangements also allow easy connection and disconnection without tools.

While the above is a description of various embodiments of inventive features, further modifications may be employed without departing from the spirit and scope of the present invention. For example, the second control unit 31 and third control unit 32 in the described embodiment were constructed as separate units, but the control units 31 and 32 may be formed as a single unit. Y-terminals and FASTON terminals were provided as examples of crimped terminals, but many other types of terminals such as ring terminals and bullet connectors could be used as well. While the bicycle speed was detected using pulses from the hub dynamo 10, the speed instead may be detected via pulses from a conventional rotation detector comprising magnets disposed on a wheel and a reed switch disposed on the frame.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle electrical control apparatus comprising:
a first control unit that provides first electrical signals;

a second control unit that provides second electrical signals;

an electrical connecting cord having a first end coupled to the first control unit and a second end coupled to the second control unit for communicating the first electrical signals from the first control unit to the second control unit;

wherein the electrical connecting cord communicates the first electrical signals from the first control unit to the second control unit through a plurality of communication paths as a self-contained unit;

a first connecting terminal fastened to one of the communication paths at one of the first and second ends of the electrical connecting cord;

a second connecting terminal disposed on one of the first and second control units; and wherein the first connecting terminal is detachably connected to the second connecting terminal such that the first connecting terminal normally is attached to and detached from the second connecting terminal independently of any other connecting terminals fastened to other ones of the plurality of communication paths at the one of the first and second ends of the electrical connecting cord.

2. The apparatus according to claim 1 wherein the first control unit is operated by power provided by a power supply mounted to the bicycle.

3. The apparatus according to claim 1 wherein the first electrical signals comprise signals that correspond to a state of motion of the bicycle.

4. The apparatus according to claim 3 wherein the state of motion of the bicycle is bicycle speed.

5. The apparatus according to claim 4 wherein the first control unit receives pulses corresponding to bicycle speed and provides first electrical signals that correspond to bicycle speed from the pulses.

6. The apparatus according to claim 5 wherein the pulses arise from an output of a dynamo.

7. The apparatus according to claim 1 wherein the first electrical signals comprise power signals.

8. The apparatus according to claim 7 wherein the second control unit is operated by the power signals.

9. The apparatus according to claim 1 wherein the first electrical signals comprise control signals.

10. The apparatus according to claim 9 wherein the second control unit is controlled by the control signals.

11. The apparatus according to claim 1 wherein the second electrical signals comprise drive signals for driving a moving electrical component.

12. The apparatus according to claim 11 wherein the second electrical signals comprise drive signals for moving a suspension component.

13. The apparatus according to claim 11 wherein the second electrical signals comprise drive signals for moving a gear change component.

14. The apparatus according to claim 1 wherein the second electrical signals comprise drive signals for driving an electrical display.

15. The apparatus according to claim 1 wherein the first electrical signals comprise power signals and control signals.

16. The apparatus according to claim 15 wherein the first electrical signals comprise a composite signal that contains the power signals and the control signals.

17. The apparatus according to claim 1 wherein one of the first and second connecting terminals is structured to screw onto the other one of the first and second connecting terminals.

18. The apparatus according to claim 17 wherein the one of the first and second connecting terminals comprises a Y-terminal.

19. The apparatus according to claim 1 wherein one of the first and second connecting terminals comprises a male terminal, and wherein the other one of the first and second connecting terminals comprises a female terminal.

20. The apparatus according to claim 19 wherein the first and second connecting terminals comprise FASTON terminals.

21. The apparatus according to claim 1 wherein the first connecting terminal is crimped onto the one of the first and second ends of the electrical connecting cord.

22. The apparatus according to claim 1 further comprising:

a third connecting terminal fastened to the other one of the first and second ends of the electrical connecting cord; and a fourth connecting terminal disposed on the other one of the first and second control units.

23. The apparatus according to claim 22 wherein the third connecting terminal comprises one of a multi-terminal socket and a multi-terminal plug, and wherein the fourth connecting terminal comprises the other one of the multi-terminal socket and the multi-terminal plug.

24. The apparatus according to claim 22 wherein one of the third and fourth connecting terminals is structured to screw onto the other one of the third and fourth connecting terminals.

25. The apparatus according to claim 22 wherein one of the third and fourth connecting terminals comprises a male terminal, and wherein the other one of the third and fourth connecting terminals comprises a female terminal.

26. The apparatus according to claim 1 wherein the first connecting terminal is connected to an individual wire.

* * * * *